US008234392B2

(12) United States Patent
Graffagnino et al.

(10) Patent No.: US 8,234,392 B2
(45) Date of Patent: Jul. 31, 2012

(54) METHODS AND APPARATUSES FOR PROVIDING A HARDWARE ACCELERATED WEB ENGINE

(75) Inventors: Peter Graffagnino, San Francisco, CA (US); Dave Hyatt, Mountain View, CA (US); Richard Blanchard, Sonoma, CA (US); Kevin Calhoun, Sonoma, CA (US); Gilles Drieu, San Francisco, CA (US); Maciej Stachowiak, San Francisco, CA (US); Don Melton, San Carlos, CA (US); Darin Adler, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 1608 days.

(21) Appl. No.: 11/601,497

(22) Filed: Nov. 17, 2006

(65) Prior Publication Data

US 2008/0120626 A1    May 22, 2008

(51) Int. Cl.
*G06F 15/16* (2006.01)
(52) U.S. Cl. ..................................................... 709/230
(58) Field of Classification Search .............. 345/473, 345/582, 619; 709/201, 203, 206, 213, 223, 709/231, 230, 232, 227, 217, 236, 225, 224, 709/207; 715/202, 234, 700, 716, 730, 764, 715/772, 782, 838, 757, 753, 723, 706, 277, 715/246, 236, 853, 760, 747, 744, 704, 273, 715/255; 716/20, 21; 382/176, 164, 159, 382/157, 154, 130
See application file for complete search history.

(56) References Cited

U.S. PATENT DOCUMENTS

| 5,459,529 | A | 10/1995 | Searby et al. |
| 5,534,914 | A | 7/1996 | Flohr et al. |
| 5,687,306 | A | 11/1997 | Blank |
| 5,748,775 | A | 5/1998 | Tsuchikawa et al. |
| 5,781,198 | A | 7/1998 | Korn |
| 5,812,787 | A | 9/1998 | Astle |
| 5,914,748 | A | 6/1999 | Parulski et al. |
| 5,923,791 | A | 7/1999 | Hanna et al. |
| 6,008,790 | A | 12/1999 | Shingu et al. |
| 6,016,150 | A * | 1/2000 | Lengyel et al. ............... 345/426 |

(Continued)

FOREIGN PATENT DOCUMENTS

EP        1152374        11/2001

OTHER PUBLICATIONS

Phillip Kerman, "SAMS Teach Yourself Macromedia Flash™ 5 in 24 Hours", Copyright 2001, Sams Publishing, pp. 179, 194-196, 242-244, and 273-276.

*Primary Examiner* — Asad M Nawaz
*Assistant Examiner* — Charles Murphy
(74) *Attorney, Agent, or Firm* — Blakely, Sokoloff, Taylor & Zafman LLP

(57) ABSTRACT

Methods and apparatuses for providing hardware acceleration of a web browser are disclosed. In one embodiment, a method of operating a web browser on a computer system includes analyzing a data stream having a plurality of fragments. The method further includes determining what fragments of the data stream should be rendered for storage into separate backing stores. The method further includes rendering the fragments into raster images intended for hardware acceleration. The method further includes storing the raster images in the backing stores located in a graphics processing unit.

32 Claims, 10 Drawing Sheets

U.S. PATENT DOCUMENTS

| | | |
|---|---|---|
| 6,230,174 B1 | 5/2001 | Berger et al. |
| 6,326,964 B1 * | 12/2001 | Snyder et al. .................. 345/419 |
| 6,400,374 B2 | 6/2002 | Lanier |
| 6,487,565 B1 | 11/2002 | Schechter et al. |
| 6,542,158 B2 * | 4/2003 | Cronin et al. .................. 345/473 |
| 6,720,979 B1 * | 4/2004 | Shrader ......................... 715/723 |
| 6,741,242 B1 | 5/2004 | Itoh et al. |
| 7,173,623 B2 | 2/2007 | Calkins et al. |
| 2002/0101431 A1 * | 8/2002 | Forney et al. .................. 345/582 |
| 2002/0118183 A1 | 8/2002 | Inuzuka et al. |
| 2002/0158881 A1 * | 10/2002 | vanWelzen .................. 345/582 |
| 2003/0076329 A1 | 4/2003 | Beda et al. |
| 2003/0174165 A1 * | 9/2003 | Barney ......................... 345/747 |
| 2003/0222883 A1 | 12/2003 | Deniau et al. |
| 2004/0041820 A1 * | 3/2004 | Sevigny ......................... 345/619 |
| 2004/0051728 A1 * | 3/2004 | Vienneau et al. ............. 345/723 |
| 2004/0189667 A1 | 9/2004 | Beda et al. |
| 2004/0189669 A1 | 9/2004 | David et al. |
| 2004/0205165 A1 * | 10/2004 | Melamed et al. ............. 709/219 |
| 2004/0207654 A1 * | 10/2004 | Hasuike ........................ 345/698 |
| 2004/0222992 A1 * | 11/2004 | Calkins et al. ................ 345/473 |
| 2005/0046630 A1 | 3/2005 | Jacob et al. |
| 2005/0076364 A1 | 4/2005 | Dukes et al. |
| 2005/0086317 A1 * | 4/2005 | Boyd et al. .................... 709/208 |
| 2005/0088443 A1 | 4/2005 | Blanco et al. |
| 2005/0140694 A1 | 6/2005 | Subramanian et al. |
| 2005/0243090 A1 | 11/2005 | Schneider et al. |
| 2006/0227142 A1 | 10/2006 | Brown et al. |
| 2006/0253795 A1 | 11/2006 | Titov et al. |
| 2006/0287106 A1 | 12/2006 | Jensen |
| 2007/0013699 A1 | 1/2007 | Nelson et al. |
| 2007/0236432 A1 | 10/2007 | Benjamin et al. |
| 2008/0034292 A1 | 2/2008 | Brunner et al. |

* cited by examiner

METHODS AND APPARATUSES FOR PROVIDING A HARDWARE ACCELERATED WEB ENGINE

FIELD OF THE DISCLOSURE

The subject matter of the present disclosure relates to hardware accelerating a web browser with a graphics composition engine.

BACKGROUND OF THE DISCLOSURE

A web browser is a software application that enables a user to display and interact with text, images, video and other information typically located on a web page at a website on the World Wide Web or a local area network. Text and images on a web page can contain hyperlinks to other web pages at the same or different websites. Web browsers allow a user to quickly and easily access information provided on many web pages at many websites by traversing these links. Web browsers available for personal computers include Safari, Internet Explorer, Firefox, Netscape, and Opera.

The file format for a web page is usually hyper-text markup language (HTML) and is transferred with a hyper-text transfer protocol (HTTP). Most browsers natively support a variety of formats in addition to HTML, such as the extensible markup language (XML) and image formats, and can be extended to support more through the use of plug-ins. The combination of HTML content type and uniform resource locator (URL) specification allows web page designers to embed images, animations, video, sound, and streaming media into a web page, or to make them accessible through the web page. A style sheet language such as cascading style sheets (CSS) may be used to describe the presentation of a document written in a markup language. CSS is used by both the authors and readers of web pages to define colors, fonts, layout, and other aspects of document presentation. CSS is designed to enable the separation of document content written in a markup language from document presentation written in CSS.

A typical web browser of the prior art retrieves a data stream of web content expressed in a markup language and analyzes components or elements of the data stream which can be a web page. The web browser builds a data structure in the form of a logic tree with nodes. Each node has a height, width, position, and order on the web page. The nodes of the data structure are rendered as an image into a backing store located in main memory. Rendering is the process of generating an image from a model, by means of software programs. The model is a description of objects in a strictly defined language or data structure. The render process consumes substantial processing and memory resources located in main memory.

A data stream may have dynamic content that changes based on user input, JavaScript code execution, video updating or for other reasons. For example, a component of a data stream may be modified, moved, resized, animated or changed in some way. A component being moved creates "damage" to content in its wake that requires other components to be redrawn. A web browser displaying a web page with dynamic content would need to re-render the entire logic tree or at least the components damaged by the move. The re-rendering process consumes processing and memory resources located on a computer. Also, the re-rendering process requires additional time and slows the performance of the web browser.

The subject matter of the present disclosure is directed to overcoming, or at least reducing the effects of, one or more of the problems set forth above.

SUMMARY OF THE DISCLOSURE

Methods and apparatuses for providing a hardware accelerated web engine are disclosed. In one embodiment, a method for hardware accelerating a web browser on a computer system includes analyzing a data stream having a plurality of fragments with the data stream being processed by the web browser. The method further includes determining what fragments of the data stream should be rendered for storage into separate backing stores. The method further includes rendering the fragments into raster images intended for hardware acceleration. The method further includes causing the storage of the raster images in the backing stores located in a graphics processing unit. The web browser provides information identifying the raster images to the graphics processing unit.

In another embodiment, a method includes constructing a data structure having nodes associated with elements of a web page. The method further includes monitoring a state for each node of the data structure. The state of each node indicates whether the node has changed from a previous version of the node. The method further includes determining whether a change of the state of a node requires rendering the node into a raster image, which represents a decomposed portion of a complete image. The method further includes rendering the node into a raster image if rendering is necessary. The method further includes storing the raster image in a retained backing store located in a graphics processing unit if rendering is necessary. The method further includes compositing raster images located in retained backing stores associated with the data structure into a complete image in order to hardware accelerate the operation of the web browser.

The foregoing summary is not intended to summarize each potential embodiment or every aspect of the present disclosure.

BRIEF DESCRIPTION OF THE DRAWINGS

The foregoing summary, preferred embodiments, and other aspects of the present disclosure will be best understood with reference to a detailed description of specific embodiments, which follows, when read in conjunction with the accompanying drawings, in which.

Figure 1:
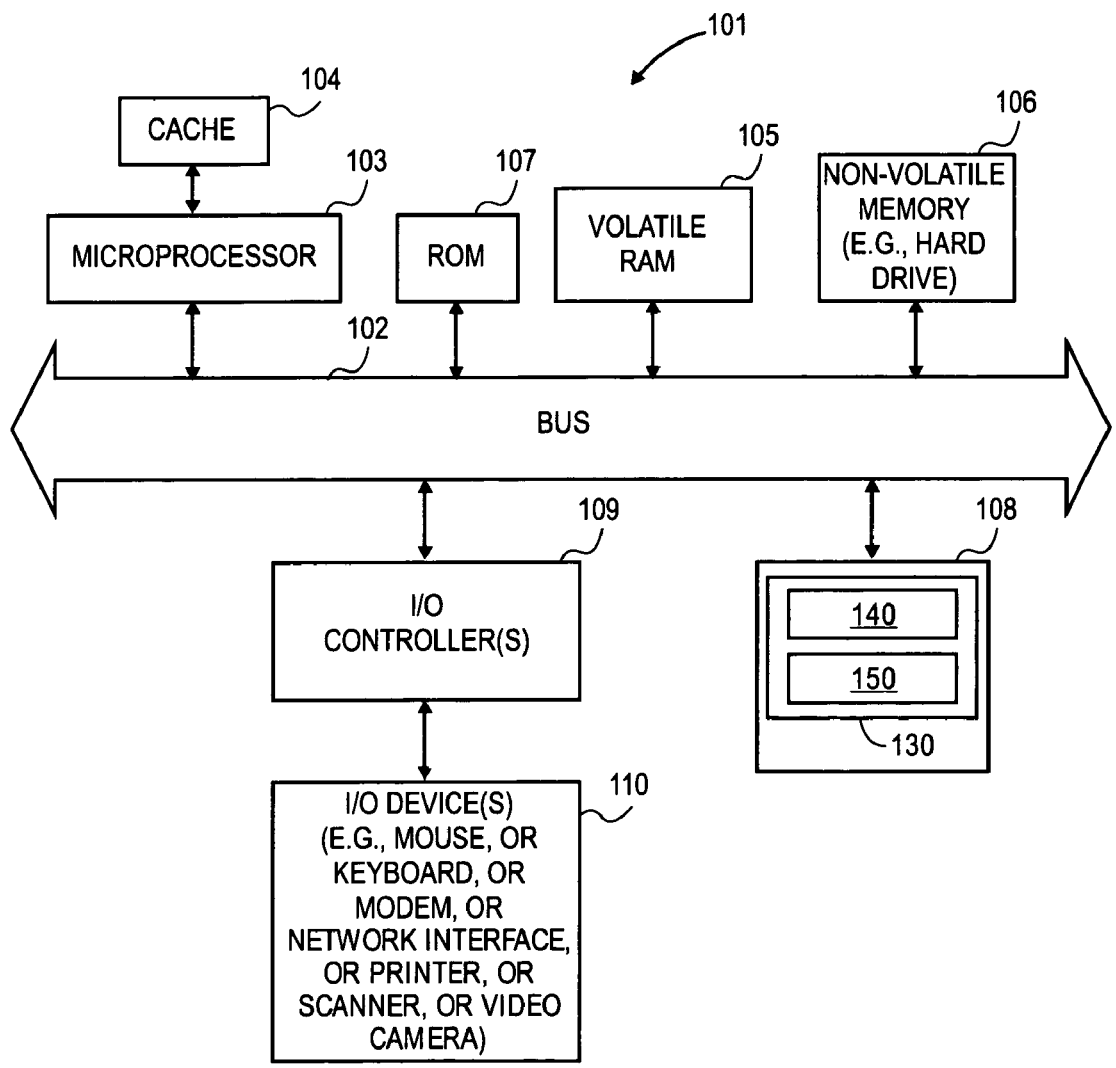
FIG. 1 illustrates a block diagram example of a data processing system according to certain teachings of the present disclosure.

While the subject matter of the present disclosure is susceptible to various modifications and alternative forms, specific embodiments thereof have been shown by way of example in the drawings and are herein described in detail. The figures and written description are not intended to limit the scope of the inventive concepts in any manner. Rather, the figures and written description are provided to illustrate the inventive concepts to a person skilled in the art by reference to particular embodiments, as required by 35 U.S.C. §112.

DETAILED DESCRIPTION

FIG. 1 illustrates a block diagram example of a data processing system according to certain teachings of the present disclosure. FIG. 1 shows one example of a typical computer system which may be used with the present disclosure. Note that while FIG. 1 illustrates various components of a computer system, it is not intended to represent any particular architecture or manner of interconnecting the components as such a method are not germane to the present disclosure. It will also be appreciated that personal digital assistants (PDAs), handheld computers, cellular telephones, media players (e.g., an iPod), devices which combine aspects or functions of these devices (e.g., a media player combined with a PDA and a cellular telephone in one device), an embedded processing device within another device, network computers and other data processing systems which have fewer components or perhaps more components may also be used to implement one or more embodiments of the present disclosures. The computer system of FIG. 1 may, for example, be an Apple Macintosh computer.

As shown in FIG. 1, the computer system 101, which is a form of a data processing system, includes a bus 102 which is coupled to a microprocessor 103 and a ROM 107 and volatile RAM 105 and a non-volatile memory 106. The microprocessor 103, which may be, for example, a microprocessor from Intel or a G3 or G4 microprocessor from Motorola, Inc. or IBM is coupled to cache memory 104 as shown in the example of FIG. 1. The bus 102 interconnects these various components together and also interconnects these components 103, 107, 105, and 106 to a display controller and display device(s) 108, which may include display devices and a graphics processing unit 130 (GPU), and to peripheral devices such as input/output (I/O) devices which may be mice, keyboards, modems, network interfaces, printers, scanners, video cameras and other devices which are well known in the art. The GPU 130 may include a microprocessor 150 and a plurality of backing stores 140 which store images prior to being displayed with display device(s). Typically, the input/output devices 110 are coupled to the system through input/output controllers 109.

The volatile RAM 105 is typically implemented as dynamic RAM (DRAM) which requires power continually in order to refresh or maintain the data in the memory. The non-volatile memory 106 is typically a magnetic hard drive or a magnetic optical drive or an optical drive or a DVD RAM or other type of memory systems which maintain data even after power is removed from the system. Typically, the non-volatile memory will also be a random access memory although this is not required. While FIG. 1 shows that the non-volatile memory is a local device coupled directly to the rest of the components in the data processing system, it will be appreciated that the present disclosure may utilize a non-volatile memory which is remote from the system, such as a network storage device which is coupled to the data processing system through a network interface such as a modem or Ethernet interface. The bus 102 may include one or more buses connected to each other through various bridges, controllers and/or adapters as is well known in the art. In one embodiment the I/O controller 109 includes a USB (Universal Serial Bus) adapter for controlling USB peripherals, and/or an IEEE-1394 bus adapter for controlling IEEE-1394 peripherals.

It will be apparent from this description that aspects of the present disclosure may be embodied, at least in part, in software. That is, the techniques may be carried out in a computer system or other data processing system in response to its processor, such as a microprocessor, executing sequences of instructions contained in a memory, such as ROM 107, volatile RAM 105, non-volatile memory 106, cache 104 or a remote storage device. In various embodiments, hardwired circuitry may be used in combination with software instructions to implement the present disclosure. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 103.

At least one embodiment of the present disclosure seeks to hardware accelerate the operation of a web browser with a graphics composition or web engine application utilizing the GPU 130 of the data processing system 100. The web browser includes a set of instructions to determine data for graphics acceleration on a graphics processing unit. The web browser further includes a set of instructions to transfer the data to the GPU 130.

The web browser may retrieve a description of a web page from a web server which is then parsed into a data structure that is stored in a memory component of the data processing system 100. The data structure is a logical representation of components or elements of the web page organized into a tree of render nodes. The nodes are conceptual and organizational. In one embodiment, the data structure enforces the order in which elements draw but does not determine the surface or surfaces to which the elements draw. In this embodiment, all render nodes render to the same underlying graphics surface. In another embodiment, the data structure enforces the order in which elements draw and also determines the surface or surfaces to which the elements draw.

In general, a separate render node is used for each sequence of renderable objects that occurs within a normal flow of a style sheet language. Most elements are in the normal flow. Text is typically within the normal flow while images are not in the normal flow. Each web page or frame has its own root node with sub-nodes being instantiated as needed according to the properties of the renderable objects a node contains. If a web page has nothing outside its normal flow, a single node will be used for all elements of the web page.

Each node has a specified position relative to its parent node as well as a Z index which defines whether the node should be drawn behind or on top of the other nodes. The web browser application may analyze the data structure and determine whether a node of the data structure should be rendered into a separate backing store located in the GPU 130. The web browser application may render the node into a raster image that is sent to the backing store 140 located in the GPU 130. The raster image represents a decomposed portion of a complete image. The microprocessor 150 of the GPU 130 may execute a graphics application to store the raster image in the backing store 140. Other raster images associated with the data structure are also stored in the backing store. The graphics application may then composite the raster images stored in the backing store 140 to create a final image displayed as a web page.

Figure 2:
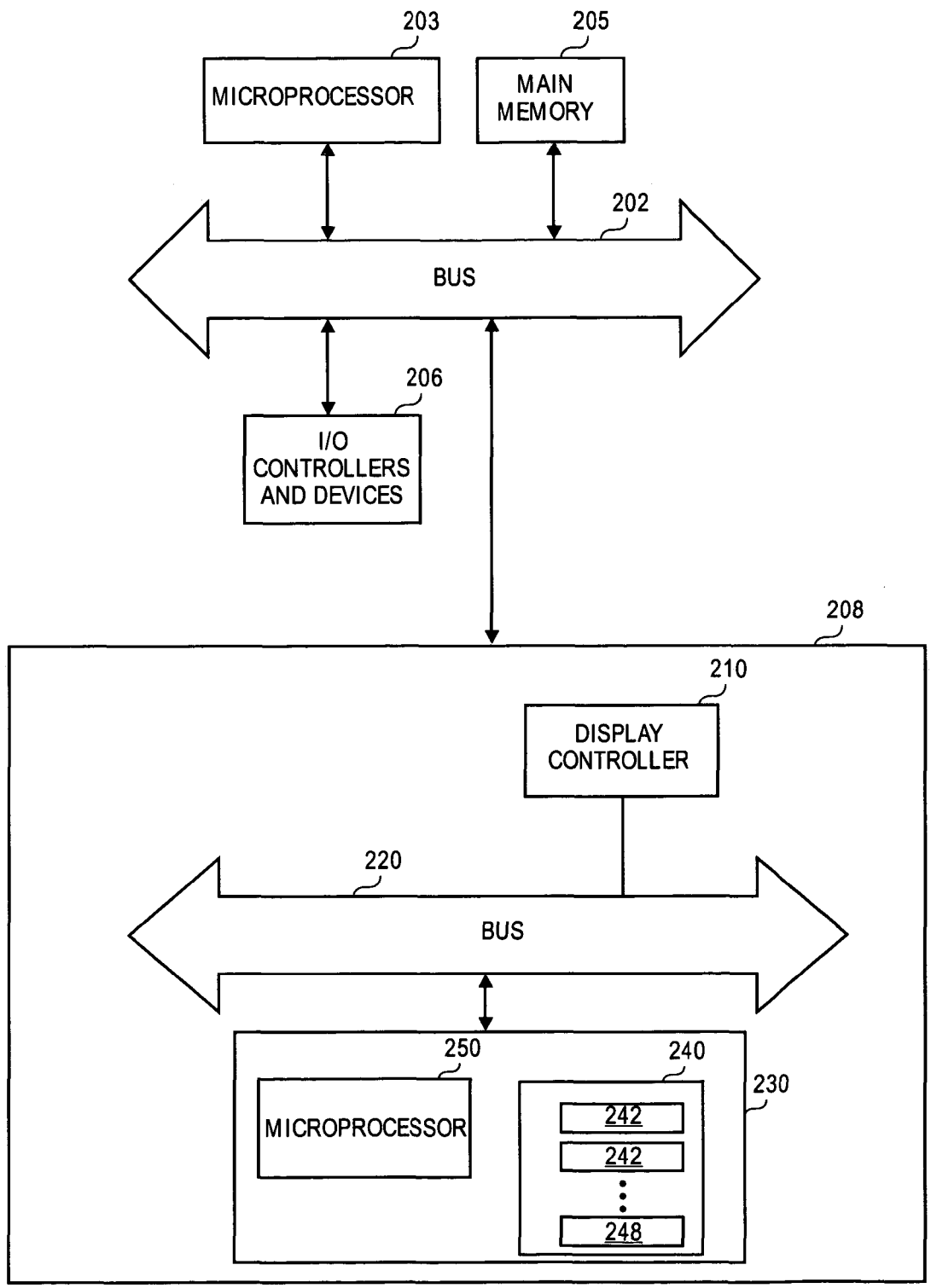
FIG. 2 illustrates a block diagram example of a data processing system according to certain teachings of the present disclosure.

FIG. 2 illustrates a block diagram example of a data processing system according to certain teachings of the present disclosure. The data processing system 200 includes a microprocessor 203, main memory 205, input/output (I/O) controller(s) and I/O devices 206 and display device(s) 208 coupled to a bus 202. The display device(s) 208 includes a display controller 210 and a graphics processing unit (GPU) 230 coupled to a bus 220. The GPU 230 includes a microprocessor 250 and a plurality of backing stores 240.

As described above, a web browser retrieves web content in the form of a data stream such as an HTML document which is then parsed into a first data structure that is stored in main memory 205 of the data processing system 200. A style sheet language such as cascading style sheets (CSS) may be used to describe the presentation of a HTML or other markup language document. The first data structure is a logical representation of components or elements of the web page in the form of a render tree having render nodes. The microprocessor 203 executing a web browser software application may analyze the first data structure and determine what render nodes of the first data structure should be rendered for storage into separate backing stores located in the GPU 230. The web browser then renders the render tree into a second data structure or layer tree that includes raster images associated with the render nodes of the render tree. Each raster image represents a decomposed portion of a complete or final image. The raster images are stored in the backing stores 240. In one embodiment, each raster images is stored in a separate retained backing store. The microprocessor 250 executes a graphics application in order to composite the raster images into a final image displayed as a web page.

A node may include an image element, a graphic element, a text element, a vector element, and/or a media element. Each node is defined by a property selected from the group consisting of a position, a coordinate system, a transform, and a relationship to another node. In one embodiment, each node is rendered into a raster image stored in a single retained backing store.

Figure 3A:
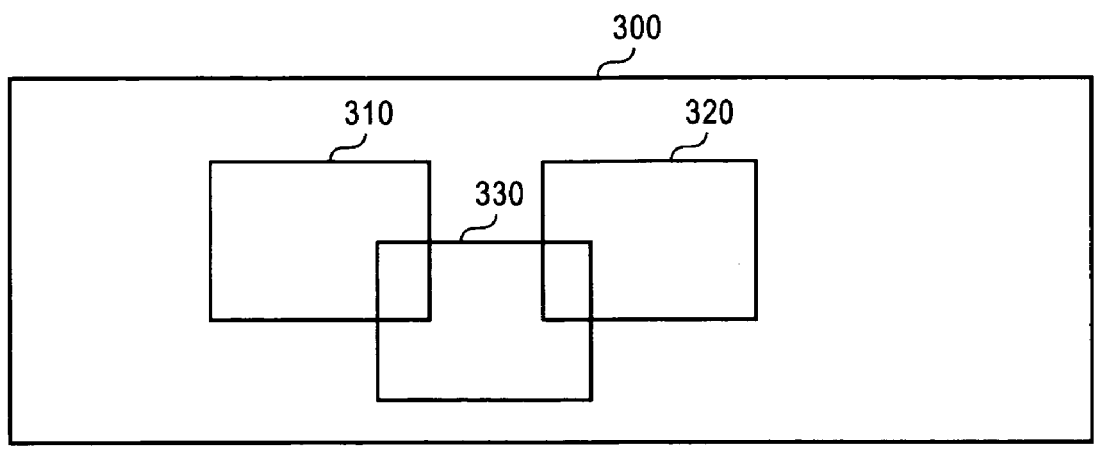
FIG. 3A illustrates a web page with multiple components according to certain teachings of the present disclosure.

FIG. 3A illustrates a web page with multiple components according to certain teachings of the present disclosure. The web page 300 includes components 310, 320, and 330. Each of these components may be nodes of a first data structure or render tree that are rendered into a second data structure or layer tree having independent layers in the form of raster images. Each raster image is stored in a separate retained backing store such as backing stores 242, 244, 246, and 248 of FIG. 2. Each raster image represents a decomposed portion of a complete or final image. A graphics application executed by the microprocessor 250 may composite the raster images associated with the components 310, 320 and 330 from the backing stores 240 into the final image displayed as web page 300. In this manner, the graphics application or web engine utilizes the hardware of the GPU 230 to accelerate the operation of a web browser.

The web browser may receive an input to animate a component of the web page 300 such as component 330. The node of the render tree associated with component 330 has a state that changes in response to the input. For example, a node being moved may change from state X to state Y which represents a change in position of the node. The web browser determines if animation of the component 330 requires re-rendering of any node of the render tree. A graphics application may instruct the GPU to composite the raster images into a final image displayed as web page 340 if no re-rendering of any node of the render tree is required.

Figure 3B:
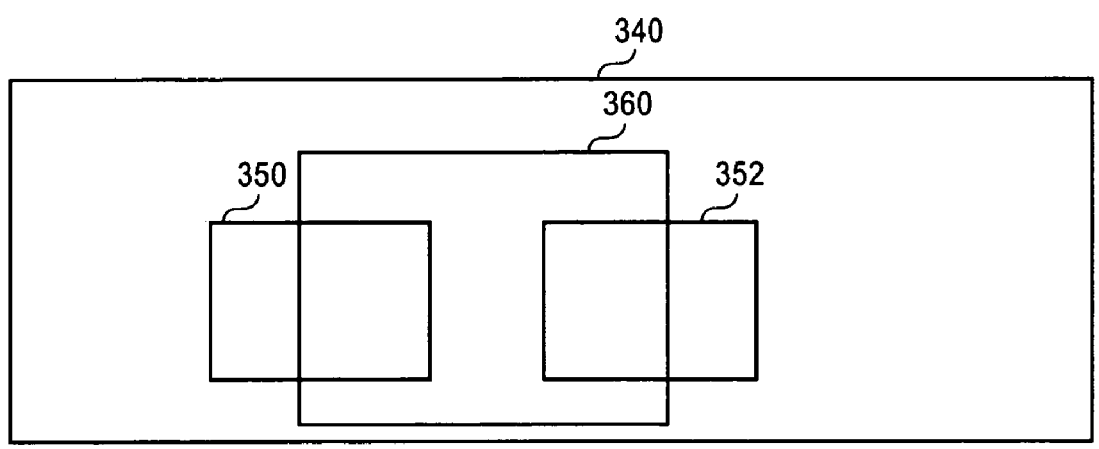
FIG. 3B illustrates resizing a component of the web page of FIG. 3A according to certain teachings of the present disclosure.

For example, FIG. 3B illustrates resizing the component 330 of the web page 300 of FIG. 3A according to certain teachings of the present disclosure. In this case of resizing, the web browser determines that the resizing of the component 330 does not require re-rendering of any node of the render tree. The GPU 230 is instructed to re-composite the raster images with the raster image associated with component 330 being resized as illustrated in FIG. 3B to display the web page 340 with component 360 being the resized version of component 330.

A "dirty region" is one or more nodes of the render tree that have changed relative to their immediate prior versions. For example, the dirty regions can be indicated by changing the state of the associated nodes of the render tree that have been changed relative to their immediately prior version. During rendering, only those nodes that have changed relative to their immediately prior version are rendered. For FIG. 3B, re-rendering was not necessary for the resizing of the component 330 into component 360. Rather, a graphics application performs the resizing during the composition of raster images to form the web page 340.

A web browser of the prior art would have re-rendered the node associated with component 330 in order to generate component 360. Also, the nodes associated with components 310 and 320 may have been re-rendered as these components are in the wake of the resizing of component 330 into component 360. Thus, the web browser of the prior art requires more processing and accessing of memory resources to perform the additional re-rendering.

Figure 3C:
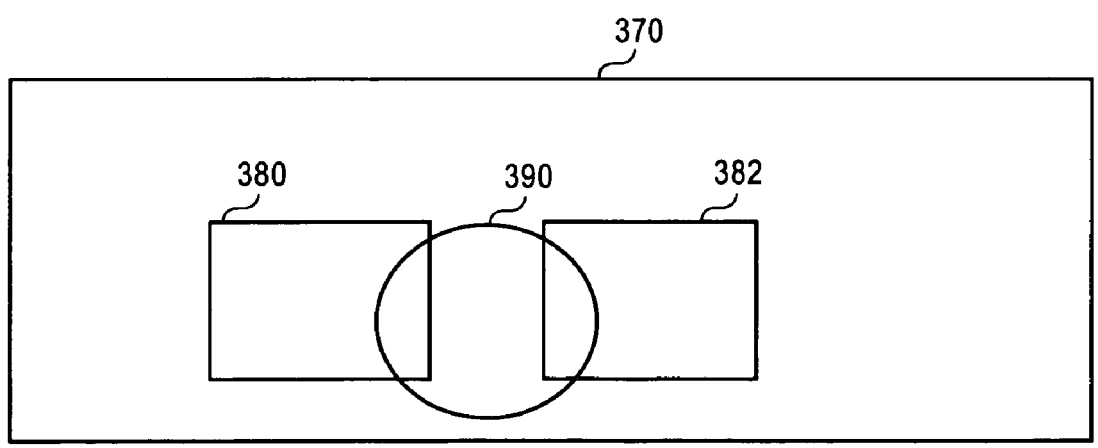
FIG. 3C illustrates altering the shape of a component of the web page of FIG. 3A according to certain teachings of the present disclosure.

FIG. 3C illustrates altering the shape of the component 330 of the web page 300 of FIG. 3A according to certain teachings of the present disclosure. In this case of altering the shape of component 330 from a square to a circle, the web browser determines that the reshaping of component 330 does require re-rendering of the node of the render tree associated with component 330. However, the other nodes of the render tree do not require any re-rendering. The node associated with component 330 is re-rendered and the associated raster image replaces the previous raster image stored in a retained backing store such as backing store 242. The GPU 230 is instructed to re-composite the raster images with the new raster image associated with component 330 being reshaped as illustrated in FIG. 3C to display the web page 370.

A web browser of the prior art would have re-rendered the nodes associated with components 310, 320, and 330 in order to generate components 380, 382, and 390 because the nodes associated with components 310 and 320 are in the wake of the reshaping of component 330 into component 390. Thus, the web browser of the prior art requires more processing and accessing of memory resources to perform the additional re-rendering.

Figure 4:
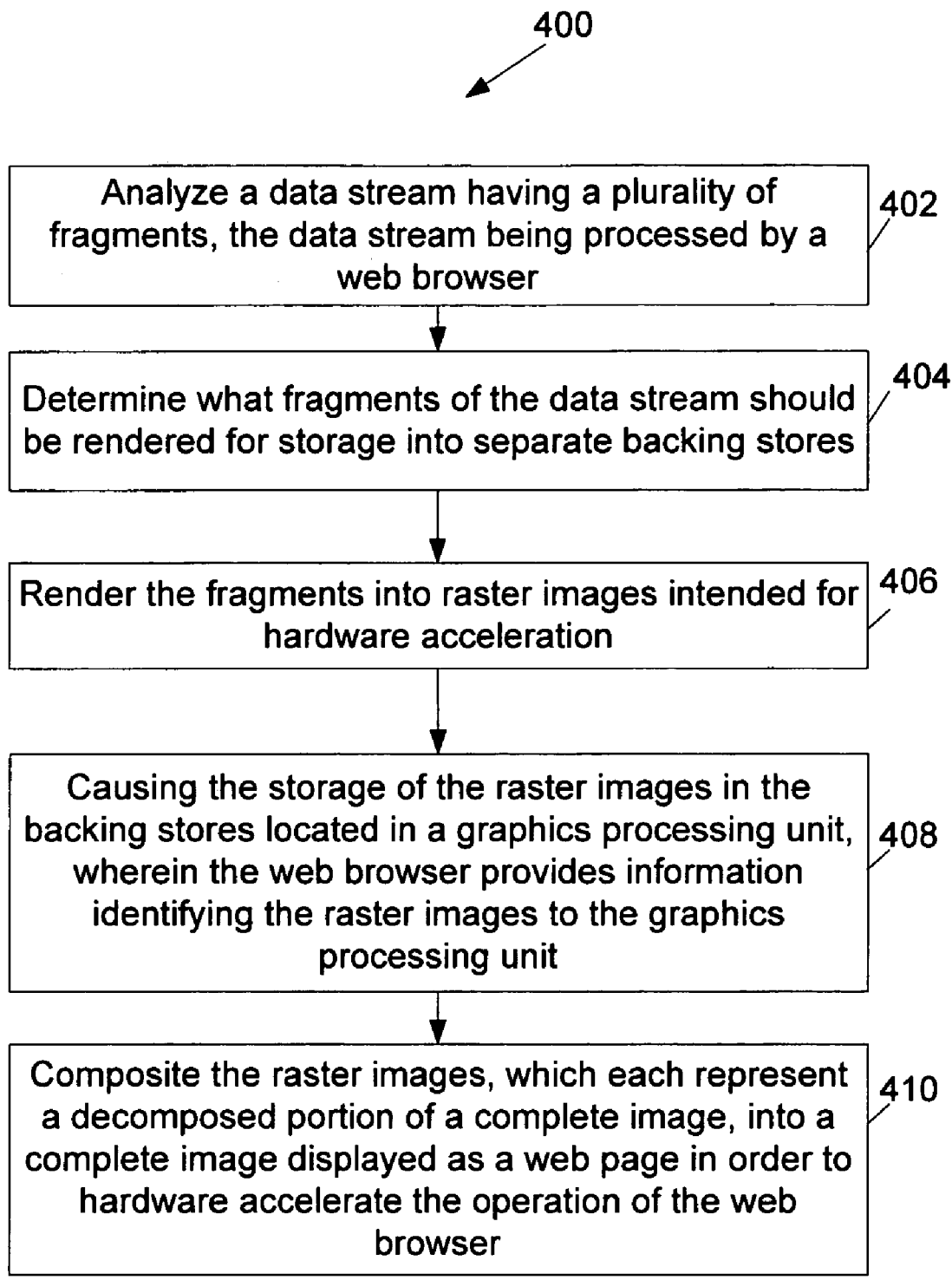
FIG. 4 illustrates a method for hardware accelerating a web browser in flow chart form according to certain teachings of the present disclosure.

FIG. 4 illustrates a method for hardware accelerating a web browser in flow chart form according to certain teachings of the present disclosure. The method 400 of operating a web browser on a computer system includes analyzing a data stream having a plurality of fragments at block 402. The data stream is processed and analyzed by the web browser at block 402. The method 400 further includes determining what fragments of the data stream should be rendered for storage into separate backing stores at block 404. The method 400 further includes rendering the fragments into raster images intended for hardware acceleration at block 406. The method 400 further includes causing the storage of the raster images in the backing stores located in a graphics processing unit (GPU) at block 408. The web browser provides information identifying the raster images to the graphics processing unit. The method 400 may further include compositing the raster images, which each represent a decomposed portion of a complete image, into a complete image displayed as a web page at block 410 in order to hardware accelerate the operation of the web browser.

In one embodiment, the method 400 hardware accelerates the formation of a web page in a web browser with a graphics processing unit that can quickly and efficiently composite raster images stored in backing stores. Each backing store may store one fragment of the data stream which may be a web page having a plurality of elements expressed in HTML or CSS. In another embodiment, the web browser is configured with no hardware acceleration of the formation of a web page.

As previously discussed, a separate node is used for each sequence of renderable objects that occurs within a normal flow of a style sheet language. Most elements are in the normal flow. Each web page or frame has its own root node with sub-nodes being instantiated as needed according to the properties of the renderable objects a node contains. If a web page has nothing outside its normal flow, a single node will be used for all elements of the web page.

In one embodiment, render objects draw in the coordinate system of the root frame. Each render object is positioned relative to their parent with horizontal and vertical offsets.

The web browser may determine what elements should be rendered from a render tree associated with the elements of the web page into raster images with each raster image stored in a separate backing store. Each backing store is associated with an independent layer of a layer tree in the form of a raster image. The layer tree has one or more nodes that may be associated with the nodes of the render tree. The web browser determines what elements to render from the render tree into raster images with each raster image stored in a separate backing store in a variety of ways. For example, a backing store may be assigned for each element of the web page. Alternatively, an independent layer may be allocated for each node of the render tree.

In one embodiment, an element may be rendered into a raster image stored in a separate backing store associated with an independent layer if the element has a specific attribute associated with the element. The specific attributes or properties may include opacity, explicit position, relative position, explicit Z ordering, or content overflow. (The terms "attribute" and "property" may be used interchangeably in the present disclosure). Opacity refers to the level of opaqueness or inversely the level of transparency for a given layer. Explicit position refers to the x and y coordinate positions of an element on a web page. Relative position refers to the x and y coordinate positions of an element in reference to another element or component on a web page. Explicit Z ordering refers to the front to back or back to front ordering of elements on a web page based on the Z index which can be modified to alter the ordering of elements.

Content overflow occurs if content is larger than the area that has been reserved for the content. The style property "overflow" controls the rendering behavior of such elements. The content may be clipped to the boundary of the element or the content may be allowed to render beyond the boundary of the element. In one embodiment, an independent layer may be allocated for an element having a combination of specific attributes which individually are not sufficient to receive an independent layer for the element.

An independent layer may be allocated for each element that provides scripting of the web page such as JavaScript code execution. An independent layer may be allocated for each element associated with an explicit indication that the element should be an independent layer. The explicit indication may be associated with the render node of the render tree. An independent layer may be allocated for certain types of content (e.g., video) as indicated by a web server or a file extension of the content.

An independent layer may be allocated for each element requiring animation which is defined as a change or modification of a component or fragment of the web page in a given time period. Animations requiring an independent layer may include a video update or changing a shape which change bit values stored in the backing stores. Animations not requiring an independent layer may include resizing, moving, or altering the opacity.

An independent layer may be allocated for a plug-in or add-on model such as a video plug-in that allows a web page author to include video in a web page. The web browser is configured to interface with the plug-in model which may receive a node of the render tree. The plug-in model determines how it would like to draw using its own facilities or having the node of the render tree rendered into a backing store for acceleration in the GPU.

The previously discussed attributes that trigger the creation of a new independent layer may be changed or extended as necessary. For example, a scalable vector graphics (SVG) language may have renderable classes that override the previous discussion of attributes triggering independent layers in order to keep the render tree shallow.

Figure 5:
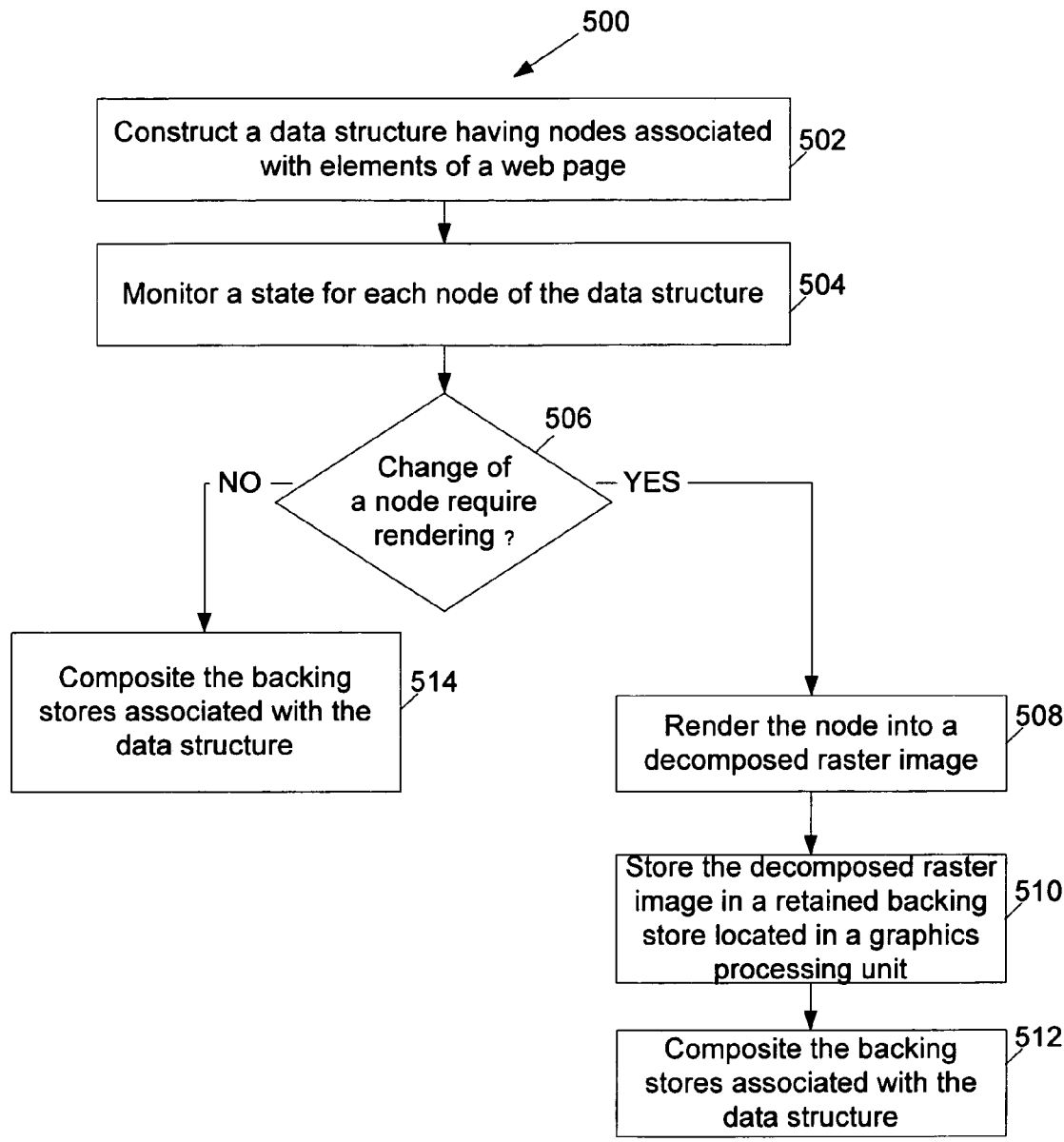
FIG. 5 illustrates a method for hardware accelerating a web browser in flow chart form according to certain teachings of the present disclosure.

FIG. 5 illustrates a method of hardware acceleration of a web browser in flow chart form according to certain teachings of the present disclosure. The method 500 includes constructing a data structure having nodes associated with elements of a web page at block 502. The method further includes monitoring a state for each node of the data structure at block 504. The state of each node indicates whether the node has changed from a previous version of the node. The method further includes determining whether a change of a state of a node requires rendering the node into a raster image at block 506. In certain embodiments, the web browser periodically, continuously, or based on a received input checks the data structure to determine if the state of the nodes have changed.

The method 500 further includes rendering the node into a raster image if rendering is necessary at block 508. In one embodiment, the web browser performs the rendering at block 508. The browser may have knowledge of the contents of the backing stores if it created the contents of the backing stores. Otherwise, a graphics processing unit (GPU) having the backing stores will have to provide this information to the browser. The method 500 further includes storing the raster image in a retained backing store located in a graphics processing unit (GPU) if rendering is necessary at block 510. The method 500 further includes compositing the backing stores associated with the data structure at block 512. If rendering is not necessary, the method 500 further includes compositing the backing stores associated with the data structure at block 514. The data structure may be a render tree organized in the form of nodes representing a grouping of elements of the web page.

Rendering may be necessary at block 506 if the change of state of a node occurs based on the shape changing or a updating a video frame. Rendering may not be necessary at block 506 if the change of state of an attribute of a node occurs based on a change in position, Z order, opacity, or scale.

Figure 6:
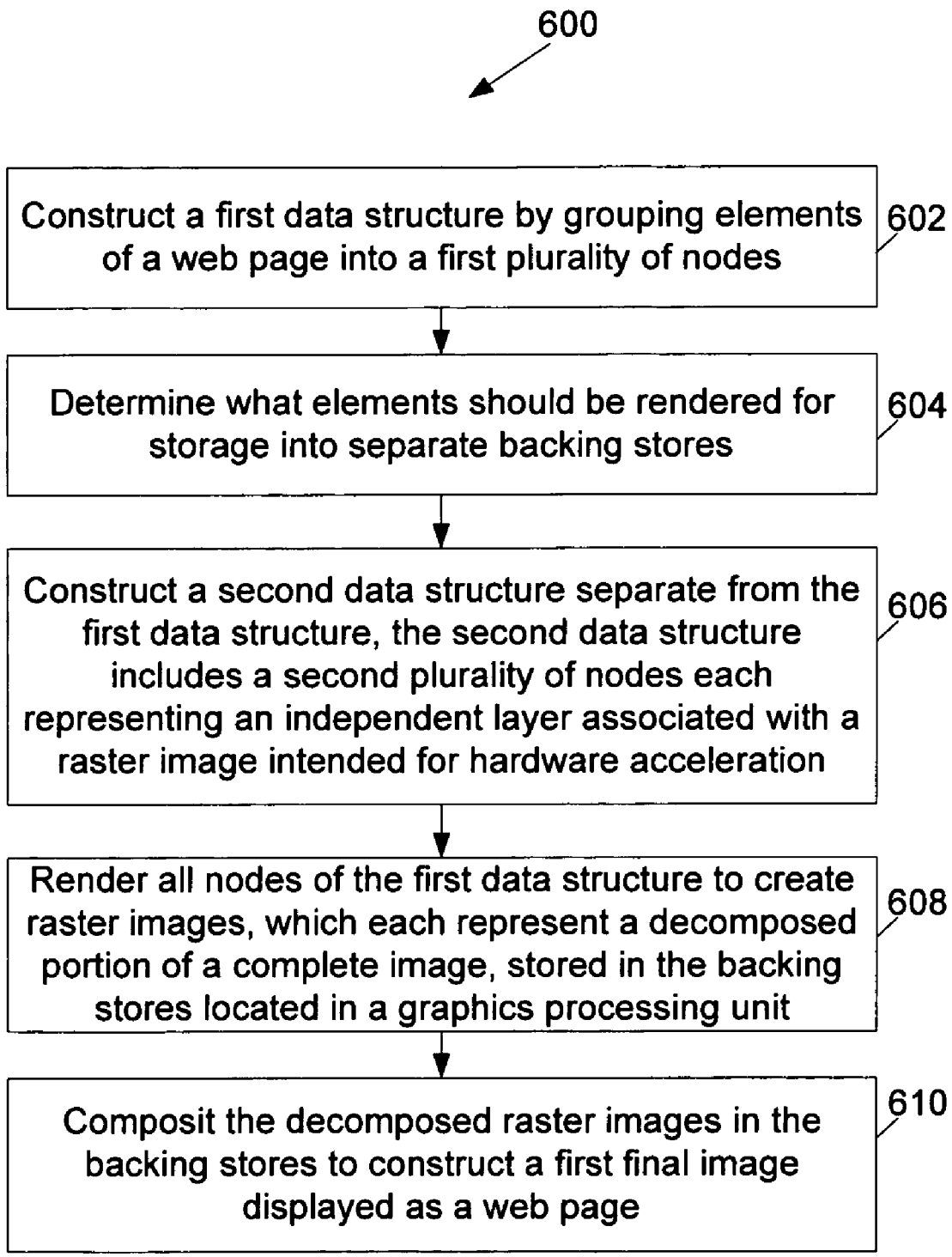
FIG. 6 illustrates a method for hardware accelerating a web browser in flow chart form according to certain teachings of the present disclosure.

FIG. 6 illustrates a method of hardware acceleration of a web browser in flow chart form according to certain teachings of the present disclosure. The method 600 includes constructing a first data structure by grouping elements of a web page into a first plurality of nodes at block 602. The method 600 further includes determining what elements should be rendered for storage into separate backing stores at block 604. The method 600 further includes constructing a second data structure separate from the first data structure at block 606. The second data structure includes a second plurality of nodes each representing an independent layer associated with a raster image intended for hardware acceleration. The method 600 further includes rendering all nodes of the first data structure to create raster images, which each represent a decomposed portion of a complete image, stored in the backing stores located in a graphics processing unit (GPU) at block 608. The GPU may receive the raster images along with attributes of the images such as transparency level and position information.

The rendering process occurs based on using existing techniques of a platform graphics library in order to create the graphics primitives of nodes of the second data structure. The method 600 further includes compositing the raster images stores in the backing stores to construct a first final image displayed as a web page at block 610.

The first data structure may include a plurality of render nodes that form a render tree. The second data structure may include a plurality of nodes with each node representing an independent layer to form a layer tree. Each independent layer of the layer tree may be associated with one node of the render tree. Alternatively, multiple nodes of the render tree may be associated with a single layer of the layer tree. Also, multiple layers of the layer tree may be associated with a single node of the render tree.

Figure 7:
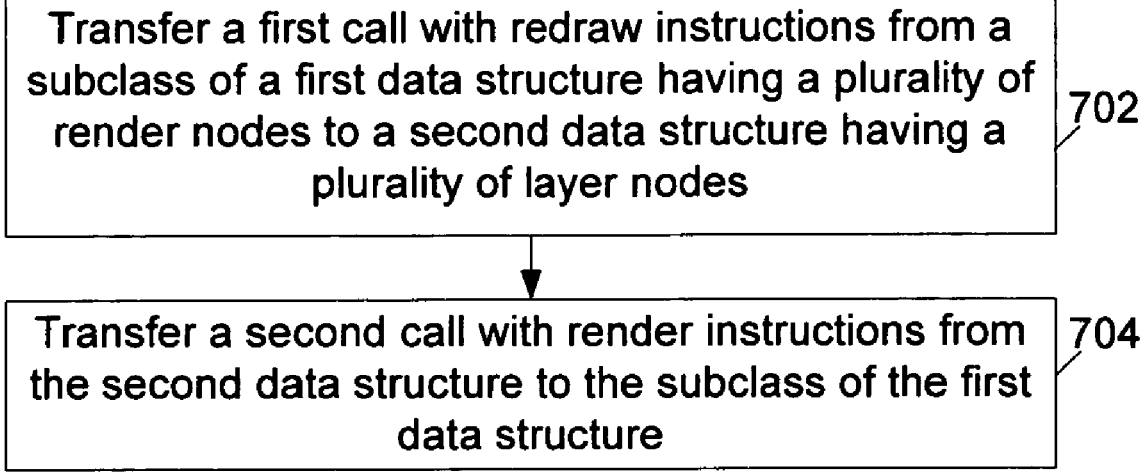
FIG. 7 illustrates details of an application programming interface in flow chart form according to certain teachings of the present disclosure.

FIG. 7 illustrates details of an application programming interface in flow chart form according to certain teachings of the present disclosure. In an environment with a web browser application and a graphics processing unit for hardware accelerating the operation of the web browser application, the application programming interface (API) interfaces between the web browser application and a graphics application controlling the graphics processing unit. The API includes transferring a first call with redraw instructions from a subclass of a first data structure having a plurality of render nodes to the second data structure having a plurality of layer nodes at block 702. The API further includes transferring a second call with render instructions from the second data structure to the subclass of the first data structure at block 704. In one embodiment, the render nodes of the first data structure may be associated with the layer nodes of the second data structure. The subclass of the first data structure creates the second data structure via the API. Changes to the render nodes of the first data structure create equivalent changes to the layer nodes of the second data structure via the API. For example, the web browser application may move, resize, or alter a render node which results in an equivalent change to the layer node associated with the render node.

In certain embodiments, the API transfers a first call with redraw instructions for a set of render nodes in a first data structure having a plurality of render nodes. The layer nodes in a second data structure that are affected by the redraw instructions are then determined. The API transfers a second call to the second data structure, passing the redraw instructions and the affected layer nodes. Given that second call, a web browser application may determine which of the layer nodes need re-rendering and what render nodes within those layer nodes need re-rendering and what regions within those layers are damaged such as a rectangular region. The API transfers a third call to the first data structure with render instructions for each set of render nodes that need to be rendered within each of the layers. Once the render nodes have been re-rendered, the parts of the decomposed raster images in the backing stores in the second data structure are re-composited to construct an image to be displayed to show the changes to the web page.

The graphical processing unit (GPU) accelerates changes to the layer nodes of the second data structure by efficiently animating the visual scene. Central processing resources can process other tasks without being concerned with animation and graphics that are accelerated by the GPU.

Referring back to FIG. 6, the web browser may determine what elements should be rendered for storage into separate backing stores in a variety of ways at block 604. In one embodiment, an independent layer may be allocated to a separate backing store for each element having a specific attribute associated with the element. The specific attribute may include opacity, explicit position, relative position, or explicit Z ordering. In one embodiment, an independent layer may be allocated for an element having a combination of specific attributes which individually are not sufficient to receive an independent layer for the element.

An independent layer may be allocated for each element that provides scripting of the web page such as JavaScript code execution. An independent layer may be allocated for each element associated with an explicit indication that the element should be an independent layer. The explicit indication may be associated with a node of the first data structure. An independent layer may be allocated for certain types of content (e.g., video) as indicated by a web server or the file extension.

An independent layer may be allocated for each element requiring animation. Animations requiring an independent layer may include a video update or changing a shape which change bit values stored in the backing stores. Animations not requiring an independent layer may include resizing, moving, or altering the opacity.

The web browser may receive an input to animate a portion of the web page associated with a raster image stored in a backing store. The web browser determines if animation of the portion of the web page requires re-rendering of any node of the first data structure. The GPU may receive instructions from a graphics application to composite the raster images into a second final image if no re-rendering of any node of the first data structure is required. The rendering process and composition process are decoupled from each other. Composition of raster images may occur without any re-rendering of the first data structure having occurred.

The web browser may re-render a node associated with the portion of the web page if re-rendering is required. A graphics application directs the GPU to composite the raster images to construct a third final image displayed as a web page.

Figure 8:
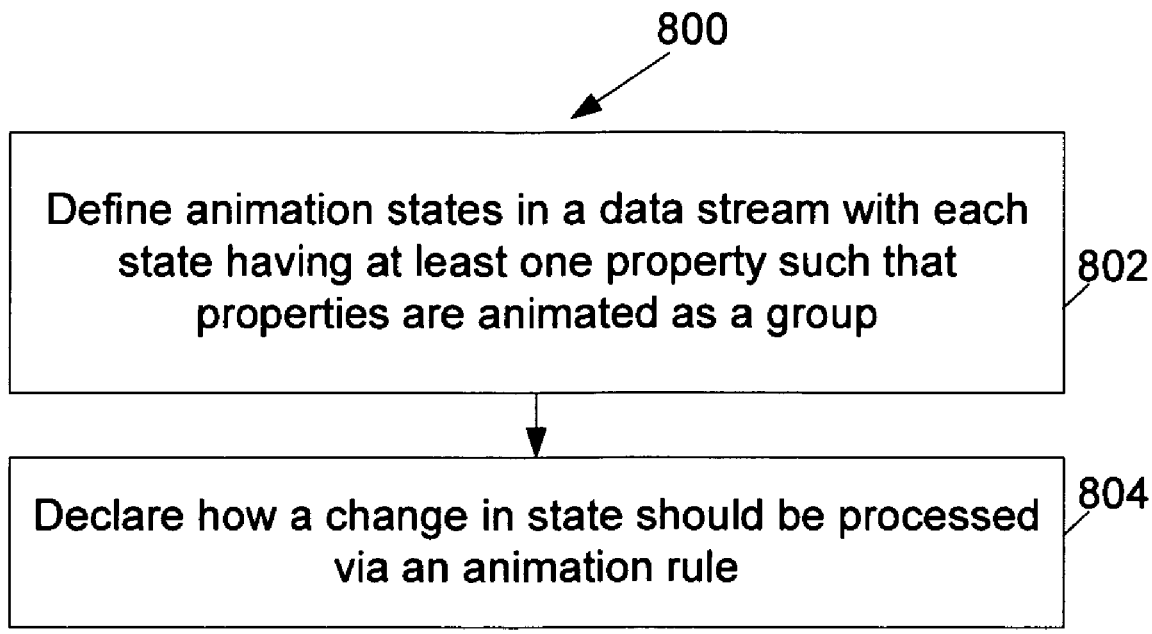
FIG. 8 illustrates a method of expressing animation in a data stream in flow chart form according to certain teachings of the present disclosure.

FIG. 8 illustrates a method of expressing animation in a data stream in flow chart form according to certain teachings of the present disclosure. The data stream may represent web content written in a markup language or CSS. The method 800 may represent an extension of CSS to include animation states. The method 800 includes defining animation states in the data stream with each state having at least one property such that properties are animated as a group at block 802. Properties expressed in the data stream may include opacity, x and y coordinate position, Z ordering, width, and height. Various x coordinate positions may be grouped into an x coordinate position property that is animated as a group. The method further includes declaring how a change in state should be processed via an animation rule at block 804. Declaring how a change in state should be processed via an animation rule may occur with a sequence of states rather than only one change in state.

An animation rule may include defining a duration for each property that is expected to change. An animation rule may include defining a transition for each property that is expected to change. A property has a numeric or non-numeric value. The transition associated with a property having a numeric value includes an interpolation function such as a pre-defined interpolation function or a custom interpolation function using expression language. The transition associated with a property having a non-numeric value includes a cutoff transition for the property.

In at least one embodiment, an extension to CSS occurs based on defining animation states in the data stream with each state having at least one property such that properties are animated as a group. In other embodiments, an extension to CSS occurs based on declaring how a change in state should be processed via an animation rule.

In certain embodiments, the animation rules and states of method 800 are extending into the data stream received by a web browser being hardware accelerated in accordance with the method 600. For example, the method 600 includes constructing a first data structure by grouping elements of a data stream into a first plurality of nodes at block 602. The first data structure would include information representing the animation rules and states of method 800. The method 600 further includes determining what elements should be rendered for storage into separate backing stores at block 604. The method 600 further includes constructing a second data structure separate from the first data structure at block 606. The second data structure includes a second plurality of nodes each representing an independent layer associated with a raster image intended for hardware acceleration. The second data structure would include information representing the animation rules and states of method 800. The method 600 further includes rendering all nodes of the first data structure to create raster images, which each represent a decomposed portion of a complete image, stored in the backing stores located in a graphics processing unit (GPU) at block 608. The GPU may receive the raster images along with attributes of the images such as transparency level and position information. The method 600 further includes compositing the raster images stores in the backing stores to construct a first final image displayed as a web page at block 610.

A graphics application directs hardware acceleration within the GPU including the compositing of the raster images. The graphics application receives the information regarding the animation states and rules of method 800 from the second data structure in order to perform animations such as moving, resizing, changing shape, etc. Additional features and functionality of the graphics application may be enabled based on receiving the information regarding the animation states and rules for animating a data stream in accordance with the method 800.

Figure 9:
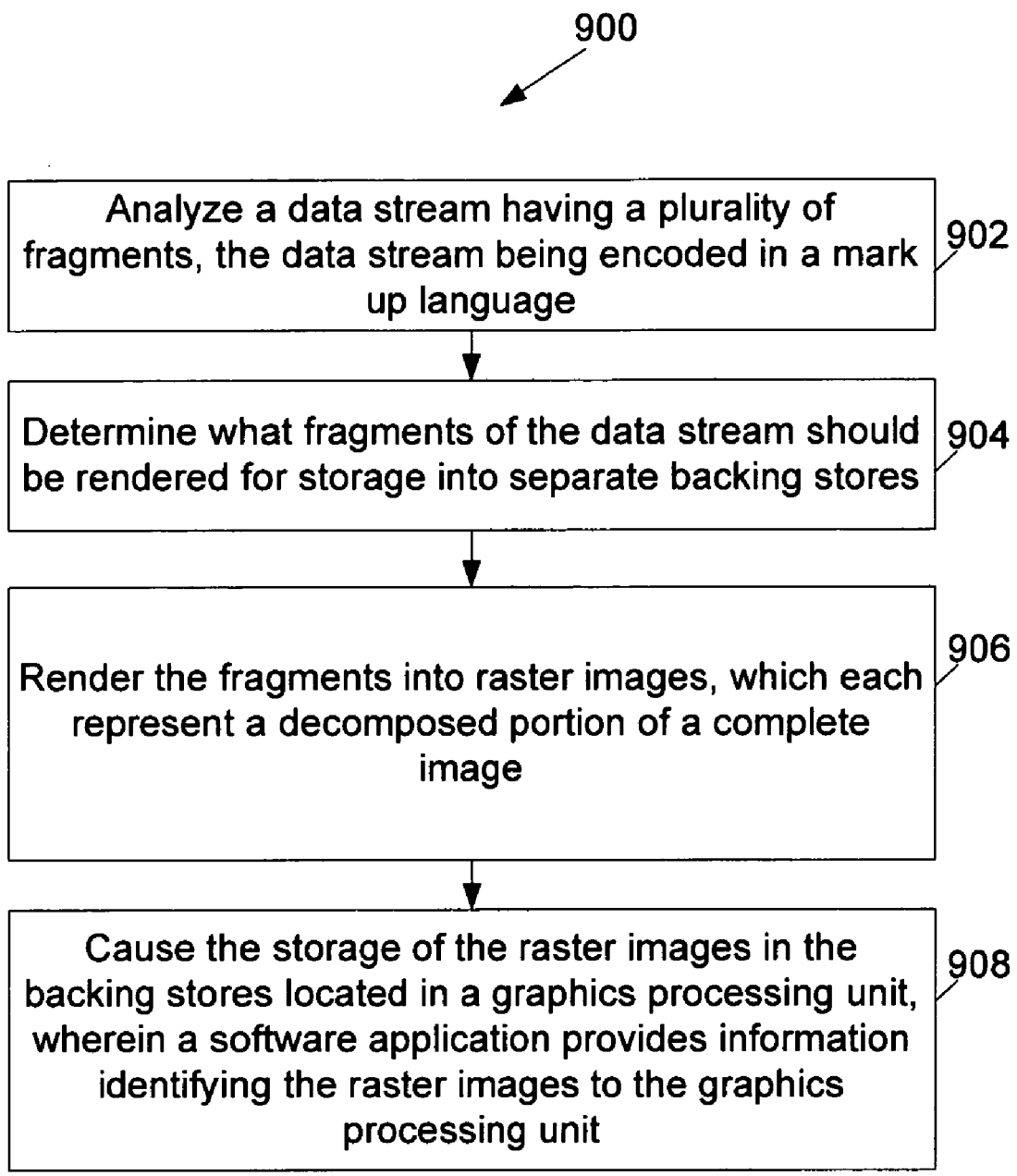
FIG. 9 illustrates a method for hardware accelerating a software application in flow chart form according to certain teachings of the present disclosure.

FIG. 9 illustrates a method of hardware acceleration of a software application in flow chart form according to certain teachings of the present disclosure. The method 900 of operating a software application on a computer system includes analyzing a data stream having a plurality of fragments at block 902. The data stream is encoded in a markup language such as HTML or XML. The method 900 further includes determining what fragments of the data stream should be rendered for storage into separate backing stores at block 904. The method 900 further includes rendering the fragments into raster images, which each represent a decomposed portion of a complete image at block 906. The method 900 further includes causing the storage of the raster images in the backing stores located in a graphics processing unit at block 908. The software application provides information identifying the raster images to the graphics processing unit. The method 900 may further include compositing the raster images into a complete image at block 910. The information identifying the raster images includes information regarding the location and attributes of the raster images. The attributes of the raster images may include opacity and position of each raster image within a complete image.

Figure 10:
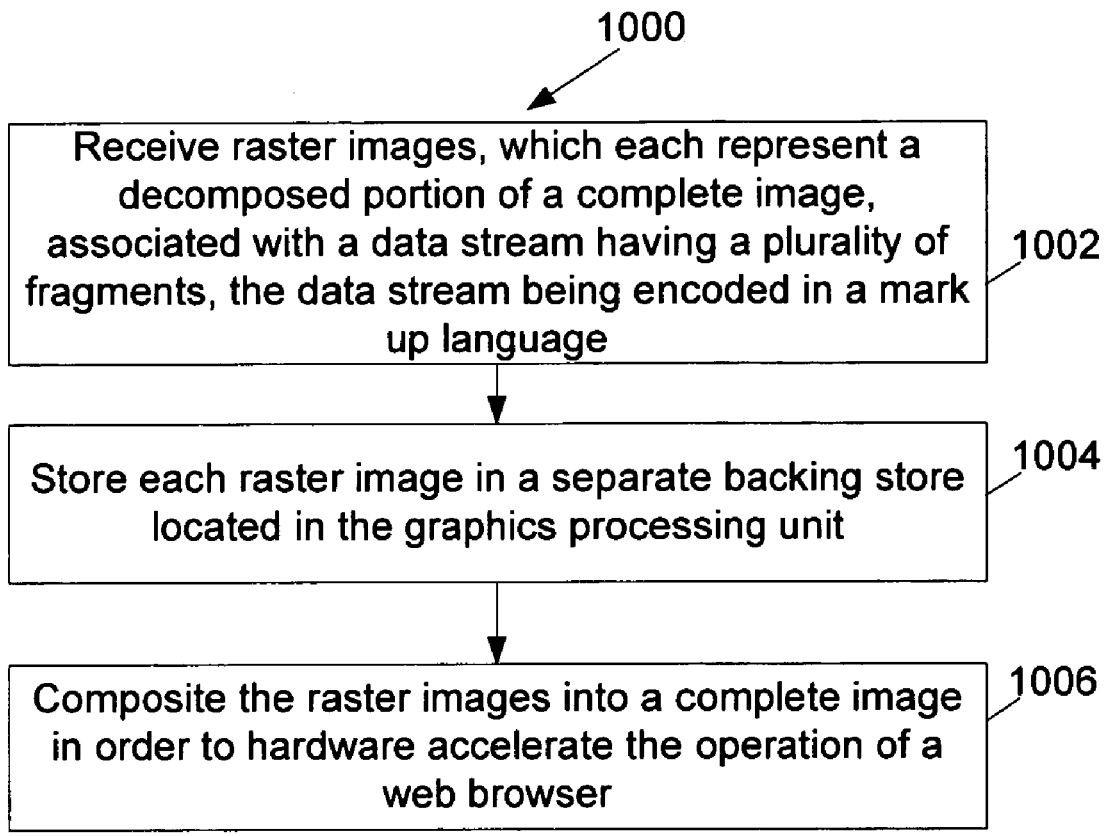
FIG. 10 illustrates a method of operating a graphics processing unit in flow chart form according to certain teachings of the present disclosure.

FIG. 10 illustrates a method of operating a graphics processing unit in flow chart form according to certain teachings of the present disclosure. The method 1000 of operating a graphics processing unit on a computer system includes receiving raster images, which each represent a decomposed portion of a complete image, associated with a data stream having a plurality of fragments at block 1002. The data stream is encoded in a markup language such as HTML or XML. The method 1000 further includes storing each raster image in a separate backing store located in the graphics processing unit at block 1004. The method 1000 further includes compositing the raster images into a final display image in order to hardware accelerate the operation of a web browser at block 1006.

The graphics processing unit may receive information identifying the raster images. The information may be received from a software application. The information that identifies the raster images may indicate the location of the raster images in the computer system. Also, the information identifying the raster images may indicate attributes of each raster image. Attributes of the raster images include opacity and position of each raster image within a complete image.

The operation of the graphics processing unit hardware accelerates the composition of raster images into a complete image which can be displayed as a web page. A software application or web browser provides information to the graphics processing unit regarding the raster images to be composited.

The foregoing description of preferred and other embodiments is not intended to limit or restrict the scope or applicability of the inventive concepts conceived of by the Applicants. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A method for hardware accelerating a web browser on a computer system, the method comprising:
   analyzing, by the web browser, a data stream having a plurality of fragments, the data stream being processed by the web browser;

determining, by the web browser, what fragments of the data stream should be rendered for storage into separate backing stores for a graphics processing unit;

rendering, by the web browser, the fragments into raster images;

causing the storage of the raster images in the backing stores for the graphics processing unit, wherein the web browser provides information identifying the raster images to the graphics processing unit; and compositing the raster images, which each represent a decomposed portion of a complete image, into a complete image displayed as a web page in order to hardware accelerate the operation of the web browser.

2. The method of claim 1, wherein the data stream comprises a web page having a plurality of elements.

3. The method of claim 1, wherein determining what fragments of the data stream should be rendered for storage into separate backing stores occurs by assigning a backing store for each fragment of the data stream.

4. The method of claim 3, further comprising:
determining what elements of the web page should be rendered for storage into separate backing stores occurs by allocating an independent layer associated with a backing store for each element having a specific attribute associated with the element, the specific attribute comprises opacity, explicit position, relative position, or explicit Z ordering.

5. The method of claim 4, wherein determining what elements of the web page should be rendered for storage into separate backing stores occurs by allocating an independent layer associated with a backing store for each element that provides scripting of the web page.

6. The method of claim 4, wherein determining what elements of the web page should be rendered for storage into separate backing stores occurs by allocating an independent layer associated with a backing store for each element associated with an explicit indication that the element should be an independent layer.

7. The method of claim 4, wherein determining what elements of the web page should be rendered for storage into separate backing stores occurs by allocating an independent layer associated with a backing store for each element having a combination of specific attributes which individually each specific attribute is not sufficient to receive an independent layer.

8. The method of claim 1, wherein determining what fragments of the data stream should be rendered for storage into separate backing stores occurs by allocating an independent layer associated with a backing store for each fragment associated with a plug-in model.

9. The method of claim 1, wherein determining what fragments of the data stream should be rendered for storage into separate backing stores occurs by allocating an independent layer associated with a backing store for each fragment requiring animation.

10. A machine-readable non-transitory medium having executable instructions to cause a machine to perform a method comprising:
analyzing, by a web browser of the machine, a data stream having a plurality of fragments, the data stream being processed by the web browser;

determining, by the web browser, what fragments of the data stream should be rendered for storage into separate backing stores for a graphics processing unit;

rendering, by the web browser, the fragments into raster images;

causing the storage of the raster images in the backing stores for the graphics processing unit, wherein the web browser provides information identifying the raster images to the graphics processing unit; and compositing the raster images, which each represent a decomposed portion of a complete image, into a complete image displayed as a web page in order to hardware accelerate the operation of the web browser.

11. A method for hardware accelerating a web browser on a computer system, the method comprising:
constructing a first data structure by grouping elements of a web page into a first plurality of nodes;

determining, by the web browser, what elements should be rendered for storage into separate backing stores;

constructing a second data structure separate from the first data structure, the second data structure comprises a second plurality of nodes each representing an independent layer associated with a raster image intended for hardware acceleration;

rendering, by the web browser, all nodes of the first data structure to create raster images, which each represent a decomposed portion of a complete image, stored in the backing stores for a graphics processing unit (GPU); and compositing the raster images stored in the backing stores to construct a first final image displayed as a web page in order to hardware accelerate the operation of the web browser.

12. The method of claim 11, further comprising:
receiving an input to animate a portion of the web page associated with a raster image stored in a backing store;

determining if animation of the portion of the web page requires re-rendering of any node of the first data structure; and instructing the GPU to re-composite the raster images into a second final image displayed as a web page if no re-rendering of any node of the first data structure is required.

13. The method of claim 12, wherein animations of the portion of the web page that do not require re-rendering of any nodes of the first data structure comprise changing at least one of: position, Z order, opacity, and scale.

14. The method of claim 12, further comprising:
re-rendering a node of the first data structure associated with the portion of the web page if re-rendering is required; and re-compositing the raster images to construct a third final image displayed as a web page.

15. The method of claim 14, wherein animations of the portion of the web page that do require re-rendering at least one node of the first data structure comprise changing shape or updating a video frame.

16. The method of claim 11, wherein determining what elements should be rendered for storage into separate backing stores occurs by allocating an independent layer for each element having a specific attribute associated with the element, the specific attribute comprises opacity, explicit position, relative position, or explicit Z ordering.

17. The method of claim 11, wherein determining what elements should be rendered for storage into separate backing stores occurs by allocating an independent layer for each element that provides scripting of the web page.

18. The method of claim 11, wherein determining what elements should be rendered for storage into separate backing stores occurs by allocating an independent layer for each element associated with an explicit indication that the element should be an independent layer.

19. The method of claim 11, wherein determining what elements should be rendered for storage into separate backing stores occurs by allocating an independent layer for each element having a combination of specific attributes which individually each specific attribute is not sufficient to receive an independent layer.

20. The method of claim 11, wherein determining what elements should be rendered for storage into separate backing stores occurs by allocating an independent layer for a plug-in model associated with the element.

21. The method of claim 11, wherein determining what elements should be rendered for storage into separate backing stores occurs by allocating an independent layer for each element requiring animation.

22. The method of claim 11, wherein each independent layer is associated with a raster image stored in a single retained backing store.

23. A machine-readable non-transitory medium having executable instructions to cause a machine to perform a method comprising:
  constructing a first data structure by grouping elements of a web page into a first plurality of nodes;
  determining, by a web browser of the machine, what elements should be rendered for storage into separate backing stores;
  constructing a second data structure separate from the first data structure, the second data structure comprises a second plurality of nodes each representing an independent layer associated with a raster image intended for hardware acceleration;
  rendering, by the web browser, all nodes of the first data structure to create raster images, which each represent a decomposed portion of a complete image, stored in the backing stores for a graphics processing unit (GPU); and
  compositing the raster images stored in the backing stores to construct a first final image displayed as a web page in order to hardware accelerate the operation of the web browser.

24. The machine-readable non-transitory medium of claim 23, further comprising:
  receiving an input to animate a portion of the web page associated with a raster image stored in a backing store;
  determining if animation of the portion of the web page requires re-rendering of any node of the first data structure; and
  instructing the GPU to composite the raster images into a second final image displayed as a web page if no re-rendering of any node of the first data structure is required.

25. The machine-readable non-transitory medium of claim 24, further comprising:
  re-rendering a node associated with the portion of the web page if re-rendering is required; and
  re-compositing the raster images to construct a third final image displayed as a web page.

26. A data processing system, comprising:
  a first microprocessor coupled to a bus;
  main memory coupled to the bus with the main memory configured to store a data structure representing a render tree having nodes for grouping elements of a web page; and
  a graphics processing unit coupled to the bus, the graphics processing unit having a second microprocessor and a plurality of backing stores with each backing store configured to store raster images associated with nodes of the render tree, wherein the first microprocessor executes a web browser application to determine what elements should be rendered for storage into the plurality of backing stores and to render the fragments into raster images, wherein the web browser provides information identifying the raster images to the graphics processing unit, and wherein the second microprocessor to execute a graphics application to composite the raster images, which each represent a decomposed portion of a complete image, into a complete image displayed as a web page in order to hardware accelerate the operation of the web browser.

27. The data processing system of claim 26, wherein the nodes comprise at least one of the following: an image element, a graphic element, a text element, a vector element, and a media element.

28. The data processing system of claim 27, wherein each of the nodes are defined by a property selected from the group consisting of a position, a coordinate system, a transform, and a relationship.

29. A method of operating a web browser software application on a computer system, the method comprising:
  analyzing, by the web browser software application, a data stream having a plurality of fragments, the data stream being encoded in a markup language;
  determining, by the web browser software application, what fragments of the data stream should be rendered for storage into separate backing stores;
  rendering, by the web browser software application, the fragments into raster images, which each represent a decomposed portion of a complete image;
  causing the storage of the raster images in the backing stores for a graphics processing unit, wherein the web browser software application provides information identifying the raster images to the graphics processing unit; and
  compositing the raster images into a complete image in order to hardware accelerate the operation of the web browser software application.

30. The method of claim 29, wherein the information identifying the raster images comprises location and attributes of the raster images.

31. The method of claim 30, wherein the attributes of the raster images comprise opacity and position of each raster image within a complete image.

32. A machine-readable non-transitory medium having executable instructions to cause a machine to perform a method comprising:
  analyzing, by a web browser software application of the machine, a data stream having a plurality of fragments, the data stream being encoded in a markup language;
  determining, by the web browser software application, what fragments of the data stream should be rendered for storage into separate backing stores;
  rendering, by the web browser software application, the fragments into raster images, which each represent a decomposed portion of a complete image;
  causing the storage of the raster images in the backing stores for a graphics processing unit, wherein the web browser software application provides information identifying the raster images to the graphics processing unit; and
  compositing the raster images into a complete image in order to hardware accelerate the operation of the web browser software application.

* * * * *